United States Patent
Tanaka et al.

(10) Patent No.: US 7,435,405 B2
(45) Date of Patent: Oct. 14, 2008

(54) ANTI-OXIDATION METHOD FOR SULFIDE MINERALS IN SULFIDE ORE

(75) Inventors: Yoshiyuki Tanaka, Ehime (JP); Ryoichi Nakayama, Ehime (JP); Hideyuki Okamoto, Ehime (JP); Masaki Imamura, Ehime (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 733 days.

(21) Appl. No.: 11/106,351

(22) Filed: Apr. 14, 2005

(65) Prior Publication Data

US 2005/0232835 A1    Oct. 20, 2005

Related U.S. Application Data

(63) Continuation of application No. PCT/JP2004/003722, filed on Mar. 19, 2004.

(30) Foreign Application Priority Data

Mar. 19, 2003 (JP) .............................. 2003-076452

(51) Int. Cl.
    *B01F 1/00* (2006.01)
(52) U.S. Cl. .............................. 423/659; 423/1; 423/23; 423/26; 423/27; 423/DIG. 17; 252/398; 252/404
(58) Field of Classification Search ................ 423/659, 423/1, 23, 26, 27, DIG. 17; 252/398, 404; 209/1, 166, 167, 901
See application file for complete search history.

(56) References Cited

U.S. PATENT DOCUMENTS

| | | | | | |
|---|---|---|---|---|---|
| 5,702,591 | A | * | 12/1997 | Okamoto et al. | ............ 209/167 |
| 6,086,847 | A | * | 7/2000 | Thompson | .................. 423/659 |
| 7,018,605 | B2 | * | 3/2006 | Kobayashi et al. | ....... 423/561.1 |

FOREIGN PATENT DOCUMENTS

| JP | 8-268823 A | * | 10/1996 |
|---|---|---|---|
| JP | 2000-96446 A | * | 4/2000 |

* cited by examiner

*Primary Examiner*—Steven Bos
(74) *Attorney, Agent, or Firm*—Katten Muchin Rosenman LLP

(57) ABSTRACT

By suppressing oxidation of sulfide minerals in sulfide ore due to bacteria or the like, this invention prevents the elution of heavy metals from the sulfide ore, and reduces the decrease in flotation performance when processing sulfide ore that is stored in a stockpile. Also, the invention makes it easier to process acidic wastewater from a stockpile or tailings dumpsite.

In order to accomplish this, oxidation of sulfide minerals in sulfide ore is suppressed by adding an antioxidant, which contains plant polyphenol and whose main component is an organic acid that contains a carboxyl group, to the sulfide ore stored in a stockpile or tailings dumpsite.

4 Claims, 3 Drawing Sheets

ANTI-OXIDATION METHOD FOR SULFIDE MINERALS IN SULFIDE ORE

CROSS REFERENCE TO RELATED APPLICATION

This application is a continuation of International Application PCT/JP2004/003722 filed on Mar. 19, 2004 and claims priority from Japanese Patent Application 2003-076452 filed on Mar. 19, 2003, the contents of which are herein wholly incorporated by reference.

BACKGROUND OF THE INVENTION

1. Field of the Invention

This invention relates to technology for preventing poor flotation performance due to oxidation of sulfide minerals in sulfide ore due to the work of bacteria when processing sulfide ore that is stored in a stockpile, and for preventing acidic wastewater that contains heavy metal components from being generated in the sulfide ore in a tailings dump site.

2. Description of the Related Art

In a non-ferrous metal mine, generally the mined sulfide ore is stored in an outdoor stockpile and quarried a fixed amount at a time, then processed using a method such as a flotation process. In the case where it is also necessary to mine low-grade sulfide ore, it is not reasonable from an economic standpoint to process it at the same time as high-grade sulfide ore, and so low-grade sulfide ore is stored separately in a special stockpile. This low-grade sulfide ore is then processed after mining of the high-grade sulfide ore has been completed, however, often it is left unattached for long periods of several years, and during that time, the sulfide minerals contained in the sulfide ore are oxidized and on oxidant film is formed on the surface formed due to the effects of bacteria in the sulfide ore such as iron oxidizing bacteria or sulfur oxidizing bacteria.

In the ore flotation process, a collector containing a hydrophobic group is caused to adhere to the surface of a certain sulfide mineral and caused to come to the surface, however, when the sulfide mineral is oxidized, the adsorption rate of the collecting agent decreases, such that the recovery rate of the target metal also decreases. In this case, countermeasures are taken such as adding a sulfidizing agent like sodium hydrosulfide and sulfidizing the surface of that sulfide mineral again, or making the particle size of the crushed ores more fine, however, the cost of the sulfidizing agent increases, and there is a need for certain processes and equipment to take such countermeasures, so the economic burden as well as other burdens become large.

Also, ultra-low-grade sulfide ore is not processed, but stored at a dumping site as tailings. The sulfide minerals such as iron pyrite that are contained in the dumped sulfide ore are exposed to and soaked in seepage water, and when oxidized by the oxidizing action of the bacteria in the sulfide ore, sulfuric acid is produced, and acidic waste water containing a heavy metal component is generated. This kind of phenomenon widely occurs in stockpiles or tailing dumpsites of sulfide ore, or in polluted or contaminated soil containing the same sulfide minerals, so neutralization and heavy metal sedimentation and separation is performed using wastewater treatment equipment.

A method of using lime to remove heavy metals as a hydroxide is widely used for processing this kind of acidic wastewater. Also, an iron co-precipitation method as disclosed in Japanese Unexamined Patent Publication No. H10-235375 or Japanese Unexamined Patent Publication No. H10-249362 is often performed. However, there is a problem in that these methods must be continued as long as acidic wastewater occurs, and reagent costs and maintenance costs of the equipment pose an economic burden.

Moreover, in methods disclosed in Japanese Unexamined Patent Publication No. H8-164399 and Japanese Unexamined Patent Publication No. H10-202300, efficiency of the process is improved by using iron oxidizing bacteria to oxidize the iron in the wastewater, however, maintenance of the equipment is still necessary, so the burden is large.

As a method for suppressing oxidation of the sulfide minerals themselves, there is a method of obtaining an anti-bacterial effect by causing a thickening agent to adhere to the surface of metal powder or metal-compound powder that is soluble in sulfuric acid, for example, there is a method disclosed in Japanese Unexamined Patent Publication No. H8-268823, however, it is difficult to perform this process uniformly and inexpensively for a large quantity of tailings or contaminated soil.

SUMMARY OF THE INVENTION

By suppressing oxidation of sulfide minerals in sulfide ore due to bacteria or the like, this invention prevents the elution of heavy metals from the sulfide ore, and reduces the decrease in flotation performance when processing sulfide ore that is stored in a stockpile. Also, the invention makes it easier to process acidic wastewater from a stockpile or tailings dumpsite.

In order to solve the aforementioned problems, oxidation of sulfide minerals in sulfide ore is suppressed by adding an antioxidant, which contains plant polyphenol and whose main component is an organic acid that contains a carboxyl group, to the sulfide ore stored in a stockpile or tailings dumpsite.

In other words, in the anti-oxidation method for sulfide minerals in sulfide ore of this invention an antioxidant, which contains plant polyphenol and whose main component is an organic acid that contains a carboxyl group, is added to the sulfide minerals of the sulfide ore.

By adding an antioxidant, which contains plant polyphenol and whose main component is an organic acid that contains a carboxyl group, to the sulfide minerals of the sulfide ore, a protecting film is formed on the surface of the sulfide minerals, and this protecting film prevents oxidation of the sulfide minerals in the sulfide ore.

Pyroligneous acid vinegar and/or bamboo vinegar can be used as the antioxidant, which contains plant polyphenol and whose main component is an organic acid that contains a carboxyl group.

With this invention, it is possible to suppress the elution of heavy metal into the water that passes through the layers of sulfide ore that are stored in a stockpile or tailings dumpsite, and thus it becomes easier to process the generated acidic wastewater. Also, when processing sulfide ore that is stored in a stockpile using an ore flotation process, it is possible to improve the recovery rate of valuable metal.

DESCRIPTION OF THE PREFERRED EMBODIMENTS

Figure 1:
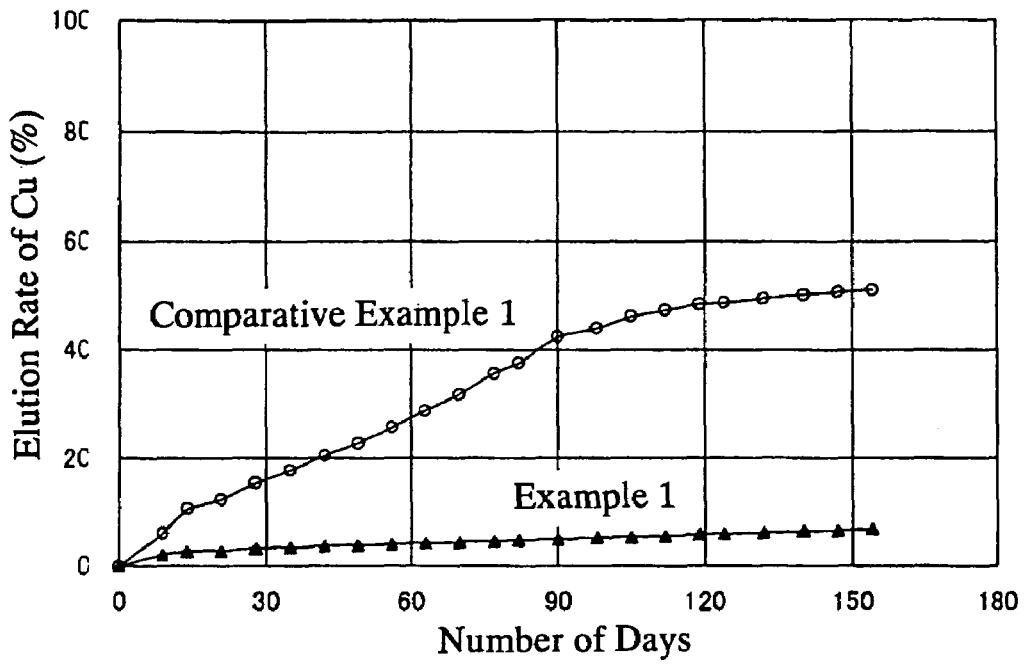
FIG. 1 is a graph showing the relationship between the elution rate and number of days of elution of iron.

As a result of devoted and committed research in order to solve the aforementioned problems, the inventors found that they were able to suppress oxidation of sulfide minerals in sulfide ore by adding an antioxidant substance to the sulfide ore containing plant polyphenol and having organic acid containing a carboxyl group as the main component.

In other words, in this invention, in the pre-processing that is performed in order to suppress oxidation of the sulfide minerals in the sulfide ore in a stock pile or tailings dump site, by adding an antioxidant substance to the sulfide ore containing plant polyphenol and having organic acid containing a carboxyl group as the main component, or more specifically, by adding 5 to 50 g, and more preferably 30 g or more of pyroligneous acid and/or bamboo vinegar to 1 kg of the stored sulfide ore, it is possible to prevent the elution of heavy metal components from the sulfide ore due to the aforementioned oxidation.

In order to maximize the effectiveness of this process, it is preferred that the aforementioned antioxidant be added at the same time or immediately after performing the work of dumping the sulfide ore containing tailings. When transporting the sulfide ore by conveyor the antioxidant can be added directly while the ore is on the conveyor. When the sulfide ore is transported by a dump truck or the like, the antioxidant can be added by using a dripping pipe, which is widely used in copper heap leaching, from above the sulfide ore that is dumped in a stockpile or tailings dump site.

Since the main component of the added antioxidant is an organic acid containing a carboxyl group such as acetic acid, the antioxidant itself has germicidal power and anti-oxidizing action, however, the polyphenol that is contained as a sub component, acts as a strong germicidal agent and antioxidant, and continues to be effective over a long period of time.

Normally, when water such as rainwater seeps into the dumped sulfide ore, the sulfide ore is oxidized by the water and the ferric ions are reduced, and oxidation of the sulfide ore is promoted by the action of the existing bacteria, so heavy metal is eluted into the water, and the water that contains the heavy metal drains out as waste water.

However, when an antioxidant exists, first, the organic acid in the antioxidant kills the bacteria on the surface of the sulfide ore, or controls an increase of the bacteria. Moreover, the antioxidant forms a protecting film (antioxidant film) on the surface of the sulfide ore, and by covering the surface of the sulfide minerals, this film suppresses any oxidation reaction of the sulfide minerals due to water or bacteria.

The polyphenol contained in the antioxidant has high affinity toward the sulfide minerals, so after the antioxidant has been applied, even though water such as rainwater may seep in from the outside and wash away the main component of the antioxidant, it causes the protecting film (antioxidant film) to remain on the surface of the sulfide minerals and maintain its antioxidant effect.

Natural materials are used as raw materials for the antioxidant used in this invention, and since pyroligneous acid or bamboo vinegar, have little effect on the environment, they are most suitable. Pyroligneous acid and bamboo vinegar are not toxic themselves, so they do not add to the burden of processing wastewater from a stockpile or dumping site.

For example, "BINCHOTAN Charcoal Pyroligneous Acid" manufactured by Aprot Co., Ltd. is used, however, it is also possible to similarly use other commercially sold pyroligneous acid or bamboo vinegar. The effect as an antioxidant depends on the type and amount of polyphenol contained, and it does not matter whether it is pyroligneous acid or bamboo vinegar. However, commercially sold pyroligneous acid or bamboo vinegar has various composition depending on its method of manufacture, so it is desirable that the effect be confirmed by preliminary testing before use. It is also possible to use pyroligneous acid or bamboo vinegar separately, or to use both of them together at the same time.

The optimum amount of antioxidant to add varies greatly according to the conposition of the target sulfide ore, and when the amount is too little, the effect is insufficient, however, when the amount is too much, the cost becomes high, so it is desirable that the optimum amount to be added be suitably set in accordance with results from preliminary testing. Normally, the amount is in the range of 5 to 50 g of antioxidant per 1 kg of sulfide ore. The reason for regulating the amount added within this range is that, in the case of normal sulfide ore, when the amount added is less than this range, the antioxidant is not dispersed at a sufficient density in the target ore, so the effect is insufficient and elution of heavy metal occurs easily, and when the amount added is greater than this range, excessive antioxidant flows outs and chemical costs are wasted. Moreover, in the case of normal sulfide ore, in order to effectively maintain the effect of the antioxidant over a long period of time, it is preferred that the amount added be 30 g or more of antioxidant per 1 kg of sulfide ore. Furthermore, after the antioxidant has been added, it is possible to prevent the antioxidant from becoming diluted by water that seeps in from the outside, by curing it for one day to two weeks until it seeps completely into the sulfide ore.

By employing the method of this invention, it is possible to prevent sulfide minerals in sulfide ore that is stored in a stockpile or dumped in a tailings site from becoming oxidized due to water or bacteria, and to suppress the elution of heavy metal into the water that passes through the layers of sulfide ore, and thus it becomes easier to process the generated acidic wastewater. Also, when processing sulfide ore that is stored in a stockpile using an ore flotation process, a decrease in flotation performance is reduced, so it is possible to improve the recovery rate of valuable metal.

EXAMPLES

Example 1, Comparative Example 1

As examples of this invention, it was presumed that acidic drainage water flows into the sulfide ore, and a simulated specimen was used in performing a process for preventing elution of the sulfide ore. The main component of the simulated specimen was a low-grade copper ore produced from mine "A" in the USA (Ore "A": 0.07% Cu, 4.0% Fe, 4.6% S). Ore "A" was air-dried, after which it was crushed in a crusher until the grain size of the entire amount was less than or equal to 12.7 mm. In order to promote elution of heavy metal in a short period of time, pyrite concentrate (0.54% Cu, 30.0% Fe, 35.2% S) that was recovered by flotation from the same ore as an iron source was added to the crushed specimen. Moreover, in order to check the amount of leaching of copper sulfide minerals, copper concentrate produced from mine "B" in the Republic of Chile (Copper concentrate "B": 30.3% Cu, 29.5% Fe, 31.5% S) was mixed with the above specimen. The reason for mixing the pyrite and the copper sulfide minerals as a concentrate is to eliminate the effect that the rock covering the material has on the elution rate of each of the sulfide minerals. The mixture ratio was 1,250 g of pyrite concentrate (789 g when converted to the amount of pyrite) and 450 g of copper concentrate "B" per 11 kg of ore "A". In analyzing the prepared simulated specimen, the respective grades of iron, copper and sulfur were 1.2%, 7.5% and 8.6%.

To the prepared simulated specimen, 500 ml of "BINCHOTAN Charcoal Pyroligneous Acid" (Aprot Co., Ltd.) was added and mixed on a vinyl sheet. This corresponds to an amount of 39 g of pyroligneous acid per 1 kg of mixed ore. The mixed specimen was filled into a vinyl chloride column test apparatus having a diameter of 10 cm and height of 1 m, and placed into a temperature controlled room that was maintained at 30 deg C., and using a roller-type constant-rate pump, 5 liters of dilute sulfuric acid having a pH of 1.5 was dripped from above the column at a 5 liters per hour per 1 m$^2$ of top surface area. The fluid that flowed out from the bottom end of the column was collected in a 10-liter polyethylene container, and repeatedly supplied to the roller-type constant-rate pump.

Moreover, the elution of heavy metal in the case in which no pyroligneous acid was added was compared with example 1 as a comparative example 1. Except for the condition mentioned above, the test conditions used were the same as those used for example 1.

The change over time of the elution rate of copper is shown in FIG. 1. As shown in FIG. 1, in example 1, when dilute sulfuric acid having a pH of 1.5 was passed over the specimen for 150 days, elution of the copper was suppressed at about 6%. On the other hand, in comparative example 1, it was confirmed that the elution of copper was 50%. From this result, it is clear that the addition of pyroligneous acid has an effect in preventing the elution of copper.

Figure 2:
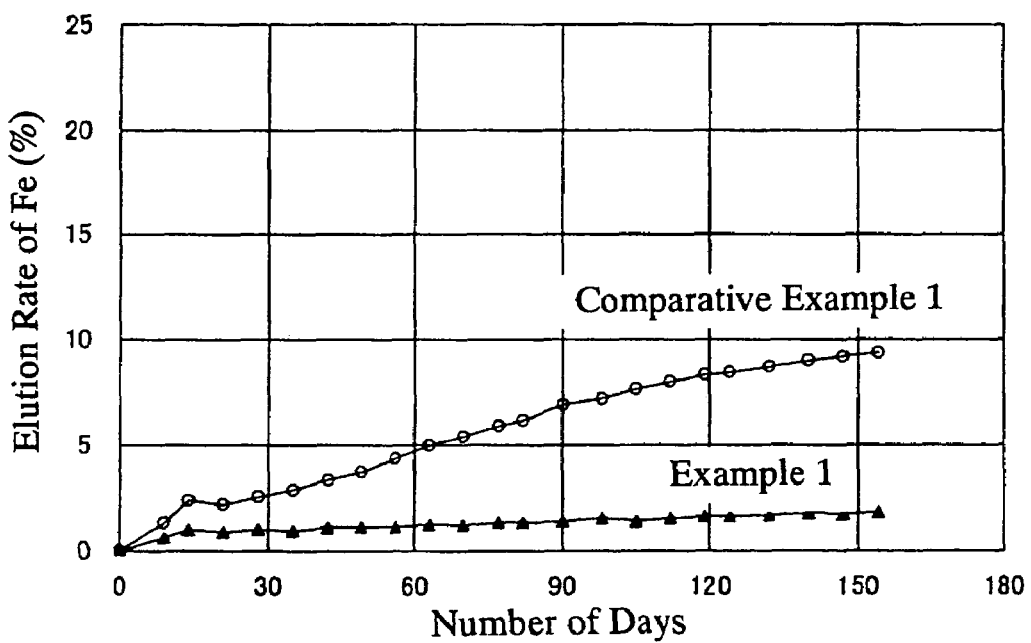
FIG. 2 is a graph showing the relationship between the elution rate and number of days of elution of copper.

The change over time of the elution rate of iron is shown in FIG. 2. In example 1, after pyroligneous acid was passed over the specimen for 150 days, the elution rate of iron was suppressed at 1.8%, and in comparative example 1 it was confirmed the elution rate was about 5 times that, or 9.4%.

Figure 3:
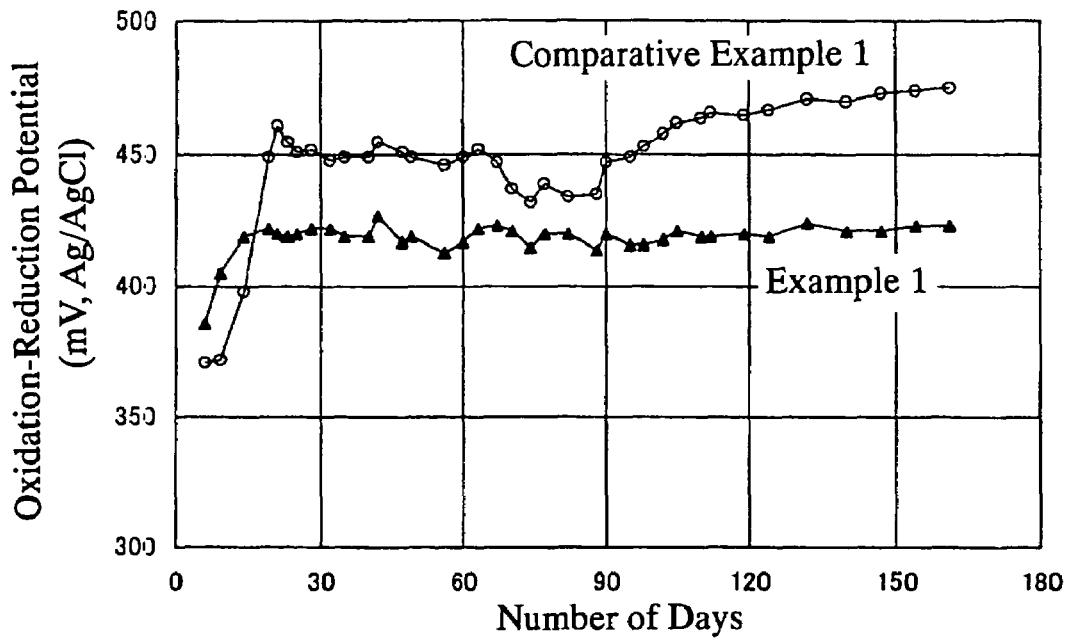
FIG. 3 is a graph showing the relationship between the oxidation-reduction potential of fluid after flowing through a column and the number of days of elution.

FIG. 3 shows the transition of the oxidation-reduction potential (Ag/AgCl electrode) of the circulated fluid after passing through the column. In example 1 in which pyroligneous acid was added, the oxidation-reduction potential was nearly a constant value, whereas in comparative example 1, the potential gradually increased, and it was found that oxidation advanced.

Example 2, Comparative Example 2

Copper sulfide ore from mine "C" in the Republic of Indonesia (ore "C": 0.54% Cu, 5.7% Fe, 0.36% S, Au 0.2 g/t) was used, and antioxidation was performed for sulfide minerals for which it is presumed that flotation of ore stored in a stockpile was performed. The ore was air-dried and crushed to a grain size of less than or equal to 12.7 mm, and 730 ml of water per 11 kg of ore "C" was added and mixed in and filled into the same kind of column test apparatus as used for example 1, then using a roller-type constant-rate pump, 500 ml of "BINCHOTAN Charcoal Pyroligneous Acid" (Aprot Co., Ltd.) was dripped from above the column at a ratio of 5 liters per hour per 1 m of top surface area. This corresponds to adding an amount of 45 g of pyroligneous acid per 1 kg of ore. The column was left for a week and the surplus fluid that flowed from the bottom of the column was collected, then 5 liters of water was similarly dripped in the column using the roller-type constant-rate pump. The fluid that flowed from the bottom of the column was collected in a 10-liter polyethylene container and repeatedly supplied to the roller-type constant-rate pump. Thirty six days after starting dripping of water, in order to accelerate oxidation, cultured iron oxidizing bacteria (Thiobacillus ferroxidans #3865) was grown in a 9K culture medium until the density of the bacteria concentration was $10^3$/ml, then 400 ml of that culture fluid was concentrated using centrifugal separation and added.

A specimen that was identical except for the addition of pyroligneous acid was tested using the same method of dripping water in a column as comparative example 2.

Figure 4:
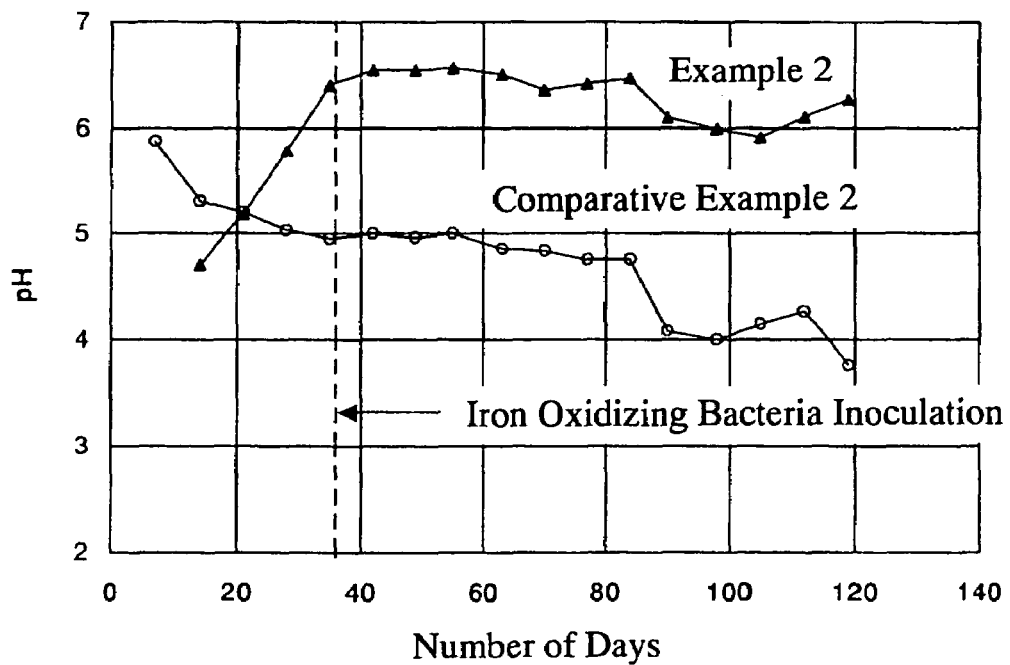
FIG. 4 is a graph showing the relationship between the pH of fluid after flowing through a column and the number of days of flow.
Figure 5:
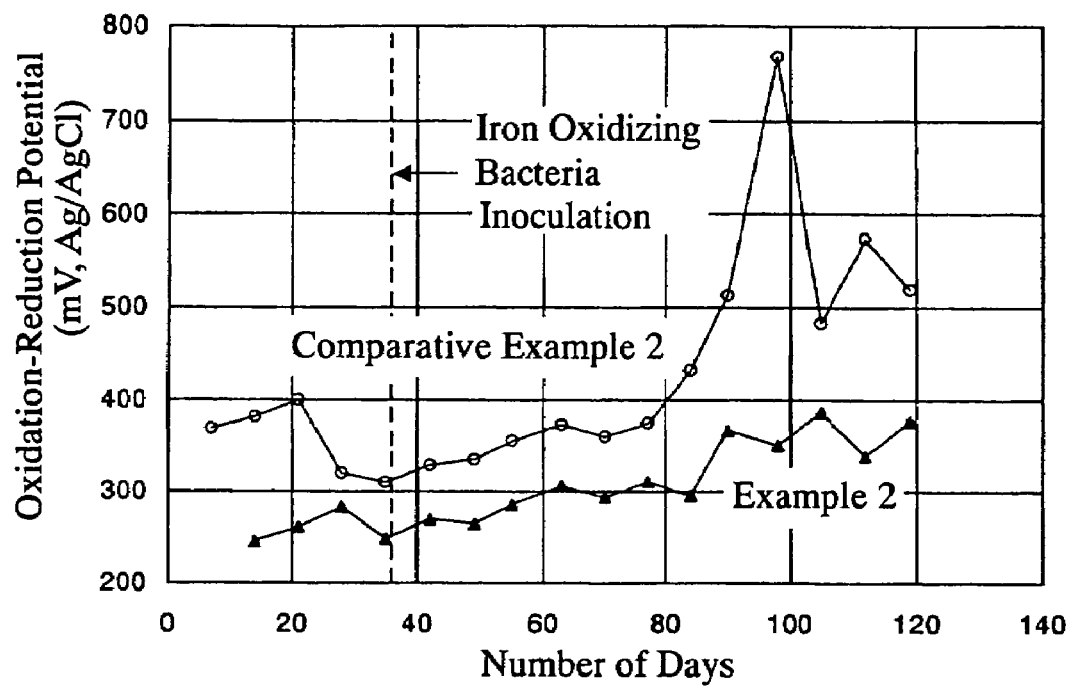
FIG. 5 is a graph showing the relationship between the oxidation-reduction potential of fluid after flowing through a column and the number of days of flow.

FIG. 4 shows the change over time of the pH of the circulated solution. In example 2, the pH of the solution after 120 days was greater than or equal to 6, however, in comparative example 2, the pH gradually decreased, and after 120 days it was less than 4. FIG. 5 shows the change over time of the oxidation-reduction potential (Ag/AgCl electrode) of the circulated solution. In both example 2 and comparative example 2, after the iron oxidizing bacteria was inoculated into the specimen, the oxidation-reduction potential gradually increased, however, in example 2 it was still less than or equal to 400 mV even after 120 days, whereas in comparative example 2 it became the maximal value of 770 mV after 98 days. This is because an increase in the iron oxidizing bacteria is suppressed by the anti-oxidation process of this invention, and thus oxidation of the sulfide minerals in the ore is suppressed, however, in the comparative example, there was a sharp increase in iron oxidizing bacteria. It is thought that the decrease in ORP (oxidation-reduction potential) after 100 days occurred because the inoculated bacteria sharply increased, so there was an insufficient nutrient source and activity decreased, which is a phenomenon that typically occurs when iron oxidizing bacteria increases.

Figure 6:
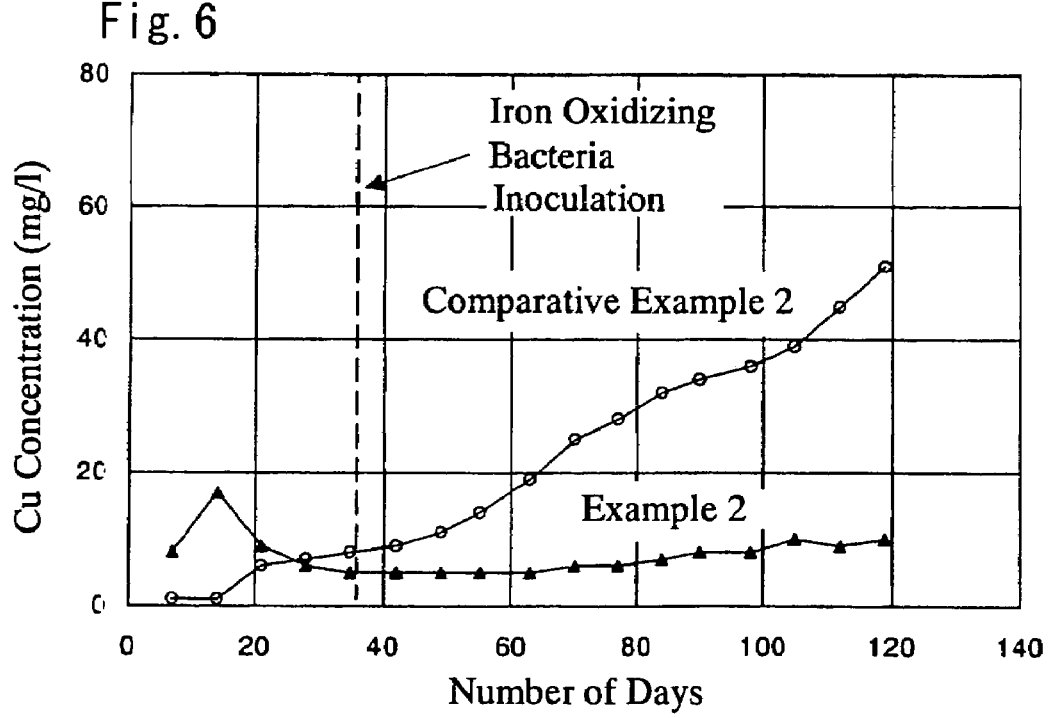
FIG. 6 is a graph showing the relationship between the copper concentration of fluid after flowing through a column and the number of days of flow.

FIG. 6 shows the change over time of the copper concentration of the circulated solution. In example 2, by including pyroligneous acid in the solution, there was elution of a minute amount of copper initially, however, it precipitated out again when the pH of the solution increased, and after 30 days, the copper concentration was maintained at less than or equal to 10 mg/l. On the other hand, in comparative example 2, the copper concentration increased as days passed, and became 56 mg/l after 120 days.

After the 120-day column-flow test ended, both specimens were removed, air-dried and crushed, and then flotation was performed in order to compare the flotation performance with the flotation performance before the column-flow test. In the flotation test, wet crushing was performed on the specimen to obtain an 80% passage grain size of 210 μm, and the pulp pH was adjusted to 9.5 using hydrated lime, then 20 g/t of Cytec Industries Inc., #533 was added as a foaming agent, and 8 g/t of Cytec Industries Inc., AP7249 and 50 g/t of potassium amyl xanthate were added as a collecting agent, and flotation was performed for 10 minutes. Compared with a recovery rate of copper of 87.1% for the specimen before the column-flow test, the recovery rate of copper after the column-flow test was 84.9% for example 2 and 78.7% for comparative example 2. Also, the recovery rate of gold for the specimen before the column-flow test was 86.3%, whereas the recovery rate of gold after the column flow test was 76.9% for example 2 and 70.1% for comparative example 2. Therefore, by performing the anti-oxidation process of this invention, it is possible to improve the decrease in the amount of the recovery rate of copper due to water-flow oxidation from 8.4% to 2.2%, and the decrease in the gold recovery rate from 16.2% to 9.4%, respectively.

What is claimed is:

1. An anti-oxidation method for sulfide minerals in sulfide ore, comprising the steps of:

providing sulfide ore containing sulfide minerals, and adding an antioxidant, which contains plant polyphenol and whose main component is an organic acid that contains a carboxyl group, to the sulfide minerals of the sulfide ore.

2. An anti-oxidation method for sulfide minerals in sulfide ore, comprising the steps of:

providing sulfide ore containing sulfide minerals, and adding an antioxidant, which contains plant polyphenol and whose main component is an organic acid that contains a carboxyl group, to the sulfide minerals of the sulfide ore, so as to form a protecting film on the surface of the sulfide minerals.

3. The anti-oxidation method for sulfide minerals in sulfide ore described in claim 1, wherein the antioxidant is pyroligneous acid and/or bamboo vinegar.

4. The anti-oxidation method for sulfide minerals in sulfide ore described in claim 1, wherein the amount of the antioxidant that is added is 5 to 50 g per 1 kg of the sulfide ore.

* * * * *